(12) United States Patent
Stratton et al.

(10) Patent No.: US 12,123,705 B2
(45) Date of Patent: Oct. 22, 2024

(54) COMBINER ALIGNMENT DETECTOR

(71) Applicant: Rockwell Collins, Inc., Cedar Rapids, IA (US)

(72) Inventors: Eric P. Stratton, Snohomish, WA (US); Ian M. Meyer, Milwaukie, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/421,517

(22) Filed: Jan. 24, 2024

(65) Prior Publication Data

US 2024/0159523 A1    May 16, 2024

Related U.S. Application Data

(63) Continuation of application No. 17/221,257, filed on Apr. 2, 2021, now Pat. No. 11,920,922.

(51) Int. Cl.
    *G01B 11/27*    (2006.01)
    *G01B 11/14*    (2006.01)
    (Continued)

(52) U.S. Cl.
    CPC .......... *G01B 11/272* (2013.01); *G01B 11/14* (2013.01); *G02B 27/0101* (2013.01);
    (Continued)

(58) Field of Classification Search
    CPC .............. G01M 11/02; G01M 11/0221; G02B 2027/011; G02B 2027/0129;
    (Continued)

(56) References Cited

U.S. PATENT DOCUMENTS

| | | | |
|---|---|---|---|
| 3,211,045 | A | 10/1965 | Gerhardt |
| 3,666,353 | A | 5/1972 | Sussman |

(Continued)

FOREIGN PATENT DOCUMENTS

| | | |
|---|---|---|
| CN | 111189621 A | 5/2020 |
| DE | 102015006284 A1 | 2/2016 |
| DE | 102019119707 | 9/2020 |

OTHER PUBLICATIONS

Department of Defense Interface Standard, "Lighting, Aircraft, Night Vision Imaging System (NVIS) Compatible", MIL-STD-2009, Feb. 2, 2001, 95 pages.
(Continued)

*Primary Examiner* — Gordon J Stock, Jr.
(74) *Attorney, Agent, or Firm* — Suiter Swantz IP

(57) ABSTRACT

A system for detecting an alignment of a relay lens assembly and a combiner of a head-up display is disclosed. The system includes an illuminated reticle spatially coupled to the relay lens assembly, an optical sensor spatially coupled to the combiner, and a control module configured to receive an input from the optical sensor, determine a position of the combiner relative to the relay lens assembly based on the received input; and generate an output based on a determined position of the combiner relative to the relay lens assembly. In another system, the illuminated reticle is spatially coupled to the combiner, and the optical sensor is spatially coupled to the relay lens assembly. The system may also participate in a feedback loop with the head-up display to reduce jitter in the head-up display.

7 Claims, 6 Drawing Sheets

(51) Int. Cl.
*G02B 27/01* (2006.01)
*G02B 27/64* (2006.01)
*G06T 7/70* (2017.01)

(52) U.S. Cl.
CPC ....... *G02B 27/0179* (2013.01); *G02B 27/646* (2013.01); *G02B 27/648* (2013.01); *G06T 7/70* (2017.01); *G02B 2027/0138* (2013.01); *G02B 2027/0183* (2013.01); *G02B 2027/0198* (2013.01)

(58) Field of Classification Search
CPC ...... G02B 2027/015; G02B 2027/0152; G02B 2027/0154; G02B 2027/0159; G02B 2027/0161; G02B 2027/0163; G02B 2027/0181; G02B 2027/0183; G02B 2027/0198; G02B 27/01; G02B 27/0101; G02B 27/0149; G02B 27/0179; G02B 27/646; G02B 27/648; G06T 7/70; G01B 11/14; G01B 11/27; G01B 11/272
See application file for complete search history.

(56) References Cited

U.S. PATENT DOCUMENTS

| | | |
|---|---|---|
| 3,885,095 A | 5/1975 | Wolfson et al. |
| 3,915,548 A | 10/1975 | Opittek et al. |
| 4,097,155 A | 6/1978 | Appert |
| 4,193,666 A | 3/1980 | Cojan |
| 4,647,967 A | 3/1987 | Kirschner et al. |
| 4,775,218 A | 10/1988 | Wood et al. |
| 4,847,603 A | 7/1989 | Blanchard |
| 5,264,913 A | 11/1993 | Hegg et al. |
| 5,453,854 A | 9/1995 | Gerbe |
| 5,572,203 A | 11/1996 | Golia et al. |
| 5,731,902 A | 3/1998 | Williams et al. |
| 6,552,789 B1 | 4/2003 | Modro |
| 7,369,101 B2 | 5/2008 | Sauer et al. |
| 7,617,022 B1 | 11/2009 | Wood et al. |
| 9,541,763 B1 | 1/2017 | Heberlein et al. |
| 9,632,304 B2 | 4/2017 | Waterman et al. |
| 9,977,247 B1 | 5/2018 | Brown et al. |
| 10,223,835 B2 | 3/2019 | Cashen et al. |
| 10,775,621 B2 | 9/2020 | Wunderwald |
| 11,067,814 B2 | 7/2021 | Ophir |
| 11,763,779 B1* | 9/2023 | Kalinowski ............. G09G 5/37 345/619 |
| 11,920,922 B2* | 3/2024 | Stratton ............. G02B 27/0101 |
| 2017/0026560 A1 | 1/2017 | Whitehouse et al. |
| 2018/0143682 A1 | 5/2018 | Larson |
| 2020/0249486 A1* | 8/2020 | Buchsbaum ....... G02B 27/0101 |
| 2021/0003851 A1 | 1/2021 | Seder et al. |

OTHER PUBLICATIONS

Extended Search Report in European Application No. 22166561.5 dated Sep. 2, 2022, 9 pages.

* cited by examiner

COMBINER ALIGNMENT DETECTOR

CROSS REFERENCE TO RELATED APPLICATION

The present application is a continuation of U.S. patent application Ser. No. 17/221,257, filed Apr. 2, 2021, titled "COMBINER ALIGNMENT DETECTOR", which is incorporated herein by reference in the entirety.

BACKGROUND

Vehicle operators such as aircraft pilots are increasingly dependent on augmented reality vision systems such as Head-Up Displays (HUDs) and Head Worn Displays (HUDs) to assist with navigation and other activities. HUDs are generally comprised of three components, a video generation computer, a projection, or "Over Head" unit that includes a relay lens assembly, and a combiner. The combiner is a partially transparent display that mixes the image from the projection unit with the real view world, such as the view from a cockpit window.

As HUD imagery often involves symbols and/or images that are overlaid of what the pilot sees through the cockpit window, it is important that the combiner accurately projects the imagery onto the cockpit window so that the HUD imagery and the real-world view are aligned properly. A proper alignment of the combiner may be determined through a combiner alignment detector (CAD). Current CADs utilize infrared or near infrared emitters coupled with detectors that are suffer from low sensitivity, low directionality awareness, and pollute night vision imaging systems. Accordingly, it is desirable to provide combiner alignment solution that is more sensitive and provides better directionality awareness than conventional approaches without polluting night vision imagine systems.

SUMMARY

A system for detecting an alignment of a relay lens assembly and a combiner of a head-up display is disclosed. In one or more embodiments, the system includes an illuminated reticle spatially coupled to the relay lens assembly, wherein a movement of the relay lens assembly results in a commensurate movement of the illuminated reticle. In one or more embodiments, the system further includes an optical sensor spatially coupled to the combiner or optically coupled to a mirror spatially coupled to the combiner. In one or more embodiments, the optical sensor is configured to detect a light pattern emitted from the illuminated reticle. In one or more embodiments, the system includes a control module comprising one or more processors and a memory. In some embodiments, the control module is configured to receive an input from the optical sensor. In some embodiments, the control module is configured to determine a position of the combiner relative to the relay lens assembly based on the received input. In some embodiments, the control module is configured to generate an output based on a determined position of the combiner relative to the relay lens assembly.

In some embodiments of the system, the illuminated reticle is configured to emit light at a wavelength equal or less than 500 nm.

In some embodiments of the system, the illuminated reticle is configured to emit light at a wavelength ranging from 430 nm to 470 nm.

In some embodiments of the system, the system further comprises the mirror coupled to the combiner, wherein the mirror is configured to reflect light from the illuminated reticle to the optical sensor.

In some embodiments of the system, the control module is configured to determine the distance between the controller and the relay lens assembly.

In some embodiments of the system the illuminated reticle comprises a light emitting diode and a diffuser.

Another system for detecting an alignment of a relay lens assembly and a combiner of a head-up display is also disclosed. In one or more embodiments, the system includes an illuminated reticle spatially coupled to the combiner, wherein a movement of the combiner results in a commensurate movement of the illuminated reticle. In one or more embodiments, the system further includes an optical sensor spatially coupled to the relay lens assembly combiner or optically coupled to a mirror spatially coupled to the relay lens assembly. In one or more embodiments, the optical sensor is configured to detect a light pattern emitted from the illuminated reticle. In one or more embodiments, the system includes a control module communicatively coupled to the optical sensor comprising one or more processors and a memory. In one or more embodiments, the control sensor is configured to receive an input from the optical sensor. In one or more embodiments, the control sensor is configured to determine a position of the combiner relative to the relay lens assembly based on the received input. In one or more embodiments, the control sensor is configured to generate an output based on a determined position of the combiner relative to the relay lens assembly.

In some embodiments of the system, the illuminated reticle is configured to emit light at a wavelength equal or less than 500 nm.

In some embodiments of the system, the illuminated reticle is configured to emit light at a wavelength ranging from 430 nm to 470 nm.

In some embodiments of the system, the system further includes the mirror coupled to the combiner, wherein the mirror is configured to reflect light from the illuminated reticle to the optical sensor.

In some embodiments of the system, the control module is configured to determine the distance between the controller and the relay lens assembly.

In some embodiments of the system, the illuminated reticle comprises a light emitting diode and a diffuser.

In some embodiments of the system, the optical sensor is configured as a camera.

In some embodiments of the system, the system is configured to participate in a feedback loop with the head-up display, wherein the control module is further configured to receive position data of at least one of the relay lens assembly, the combiner, or an emission of a flight information signal, wherein the feedback loop is configured to reduce jitter in the head-up display.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
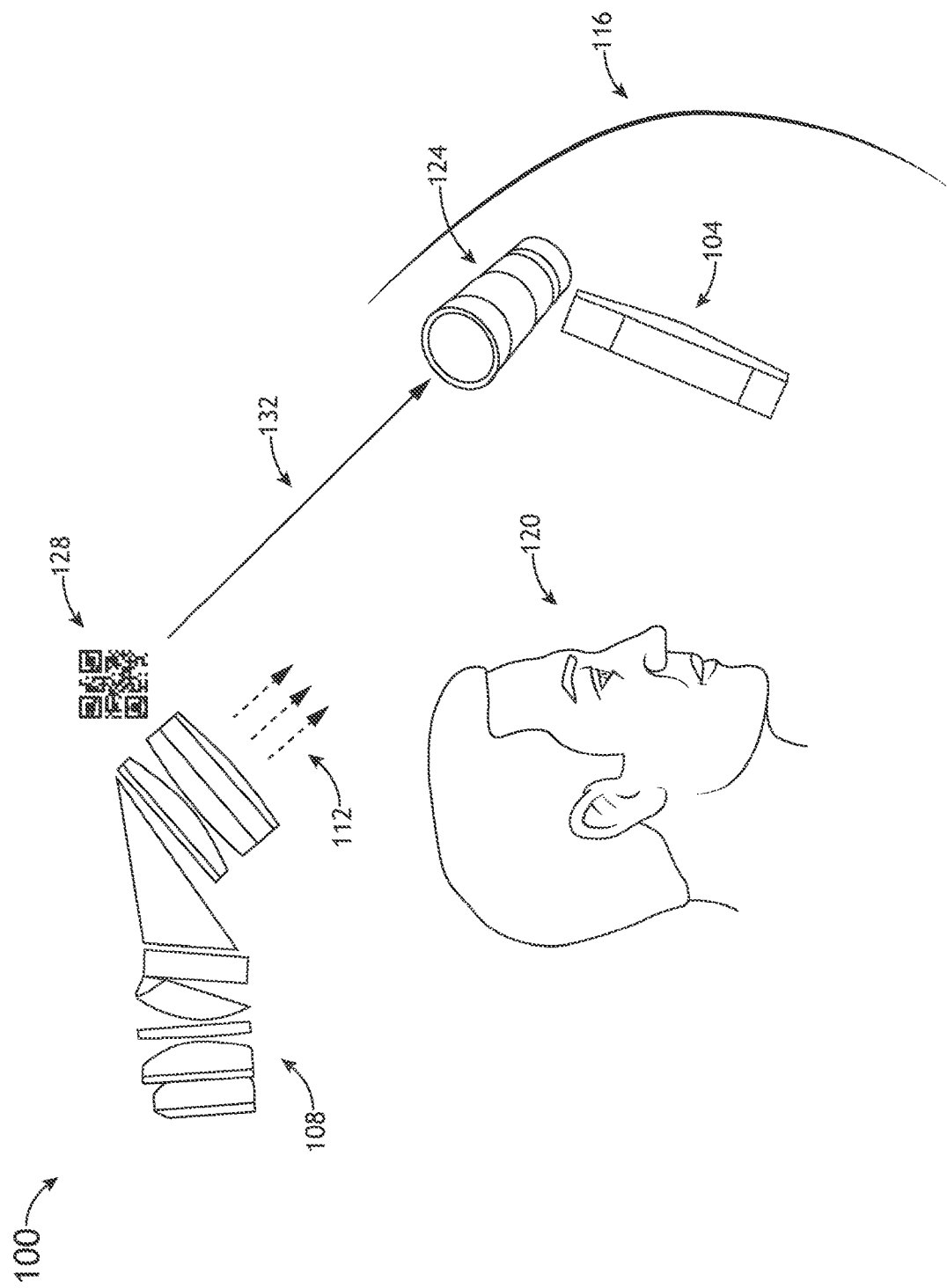
FIG. 1 illustrates a diagram of combiner alignment detector (CAD) system configured to detect the status of an optical alignment between a combiner and a relay lens assembly of a head up display (HUD), in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system for detecting an alignment of a relay lens assembly and a combiner is disclosed. Specifically, a system for detecting the alignment of a relay lens assembly of an overhead unit of a head-up display is disclosed. The system includes an illuminated reticle that is fixed to a position relative to either the relay lens assembly or the combiner, and a sensor (e.g., camera) that can detect the reticle. The sensor is fixed to a position relative to the relay lens assembly or the combiner that is opposite of that of the illuminated reticle (e.g., the illuminated reticle and the sensor are fixed to different components). The sensor is communicatively coupled to a control module configured to determine whether the combiner is configured within the correct orientation relative to the relay lens assembly.

FIG. 1 illustrates a combiner alignment detection (CAD) system 100 configured to detect the status of an optical alignment between a combiner 104 and a relay lens assembly 108 of a head up display (HUD), in accordance with one or more embodiments of this disclosure. The HUD includes the combiner 104 and the relay lens assembly 108. When in use, the relay lens assembly 108 transmits flight information 112 (e.g., a flight information signal in the form of images, text, icons) to the combiner 104, where the combiner 104 mixes (e.g., combines) the information with a real-world view, such as a view from a cockpit window 116. The HUD enables a pilot 120 to efficiently receive the flight information 112 needed for operating the aircraft. The CAD system 100 may be configured as a stand-alone system apart of the HUD, or may have one or more components combined with the HUD.

In some embodiments, the components of the HUD, including the relay lens assembly 108 are firmly installed and aligned to the aircraft using attachment bushings or hardpoints aligning to the aircraft boresight. Because of this, the relay lens assembly 108, as well as other components of the HUD, may be regarded as spatially coupled to the aircraft. That is, when the aircraft moves or suddenly shifts, the relay lens assembly 108 retains the same relative position within the aircraft. In contrast, the combiner 104 is often installed in a configuration that allows the combiner 104 to be moved from the view of the pilot 120 during specific aircraft tasks, emergencies, or accidents (e.g., to prevent head injuries). Therefore, the combiner, not being as rigidly attached to the hardpoints on the aircraft, moves considerably in relation to the aircraft as compared to the relay lens assembly, necessitating the need for the CAD system 100.

In some embodiments, the CAD system 100 includes a sensor 124 and a reticle 128 (e.g., an illuminated reticle), wherein the sensor 124 is configured to detect a reticle signal 132 emitted from the reticle 128. For example, the reticle 128 may be configured to emit electromagnetic radiation. For instance, the reticle may be configured to emit light, such as light that does not interfere with a night vision imaging system (NVIS). The sensor 124 correspondingly may be configured to detect any electromagnetic energy emitted from the reticle 128 including light, such as light that does not interfere with NVIS. The electromagnetic energy emitted of the reticle 128 may be controlled by any electrical system external or internal to the CAD system 100. For example, the CAD system 100 may supply the power for the reticle 128 and/or control the intensity of the electromagnetic energy emitted from the reticle 128. In another example, the power and/or control of the electromagnetic energy of the reticle 128 may be supplied by a circuit isolated from the CAD system 100, such as the generally lighting circuitry of the vehicle.

For reticles 128 configured to emit visible light or near-visible light (e.g., infrared light or ultraviolet light), the light source associated with the reticle 128 may include any type of light source including but not limited to light-emitting diodes (LEDs), incandescent bulbs, fluorescent lamps (e.g., compact fluorescent lamps), halogen lamps, or lasers. For example, the light source associated with the reticle 128 may be configured as a blue LED. In some embodiments, the reticle 128 further includes a diffuser configured to diffuse light. For example, the reticle may be configured as an LED optically coupled to a diffuser.

The reticle 128 may be configured to emit light of any one or more wavelengths. The reticle 128 may also be configured to emit light (e.g., an illuminating reticle 128) of any one or more or ranges of wave lengths including but not limited to light within a range of 400 nM to 525 nm, within a range of 425 nm to 500 nm, within a range of 450 nm to 475 nm, within a range of 500 nm to 550 nm, and within a range from 400 nm to 450 nm. For example, the reticle 128 may be configured to emit a light of approximately 425 nm. As mentioned above, the use of short wavelength (e.g., blue or near UV) light decreases the interference with NVIS systems. For example, the reticle may be configured to ensure compliance with MIL-STD-3009 for both NVIS Class B and Class C requirements. Associated document MIL-STD-3009.pdf entitled "Department of Defense Interface Standard: Lighting, Aircraft, Night Vision Imaging System (NVIS) Compatible" published by the United States Department of Defense has been incorporated by reference in its entirety. For instance, FIG. C-6 (pg. 62) of document MIL-STD-3009.pdf provides spectral transmission requirements for a Class C NVIS objective lens by which the reticle 128 used within the Class C NVIS system would be required to emit at a compatible wavelength or set of wavelengths. In another instance, Table II to IIIA (pg. 12-15) of MIL-STD-3009.pdf provide chromaticity and radiance requirements for Class B NVIS systems by which the reticle 128 used within the Class C NVIS system would be required to emit at a compatible wavelength and/or radiance.

The reticle 128 may emit any pattern or shape of electromagnetic energy. For example, the reticle 128 may be configured to emit a light pattern that includes one or more dots. For instance, the light pattern for the reticle 128 may be configured as a set of dots having different sizes and arranged in a symmetrical pattern. The light pattern may be configured so that, once detected by the sensor 124, the CAD system 100 may recognize the light pattern and determine the X,Z position of the reticle 128 relative to the position of the sensor 124. The CAM system 100 may also be configured to determine the distance from the sensor 124 to the reticle 128 based on the dispersion of the light from the reticle 128, as the dispersion of light from the reticle 128 increases as the distance between the reticle and the sensor 124 increases.

The sensor 124 may be configured as any device configured to detect electromagnetic energy from the reticle 128. For example, the sensor 124 may be configured as an optical sensor configured with one or more photo-sensitive devices including but not limited to photoresistors, phototransistors, and photodiodes. For instance, the sensor 124 may be configured as a camera. In particular, the sensor 124 may be configured as a digital camera capable of converting a captured image into an electric signal.

In some embodiments, the reticle 128 is coupled directly or indirectly to the relay lens assembly 108, with the sensor 124 coupled directly or indirectly to the combiner 104. For example, the reticle 128 may be directly attached to a housing that houses the relay lens assembly 108, and the sensor 124 may be directly attached to the combiner. The sensor 124 detects light emitted from the reticle 128, resulting in an electrical signal that is sent from the sensor 124 for processing. Therefore, in this configuration of the CAD system 100, the reticle 128 is spatially coupled to the relay lens assembly 108 (e.g., a movement of the relay lens assembly results in a commensurate movement of the illuminated reticle), and the sensor 124 is spatially coupled to the combiner 104, allowing the CAD system 300 to accurately determine the position of the combiner 104 relative to the relay lens assembly 108 based on the input received from the sensor 124.

The reticle 128 and the sensor 124 may be arranged at any distance from each other or at any range of distance from each. For example, the reticle 128 and the sensor 124 may be positioned 5 to 10 cm from each other. In another example, the reticle 128 and the sensor 124 may be positioned 10 to 20 cm from each other. In another example, the reticle 128 and the sensor 124 may be positioned 20 to 40 cm from each other. For instance, the reticle 128 and the sensor 124 may be positioned approximately 38 cm from each other. In another example, the reticle 128 and the sensor 124 may be positioned 40 to 80 cm from each other.

Figure 2:
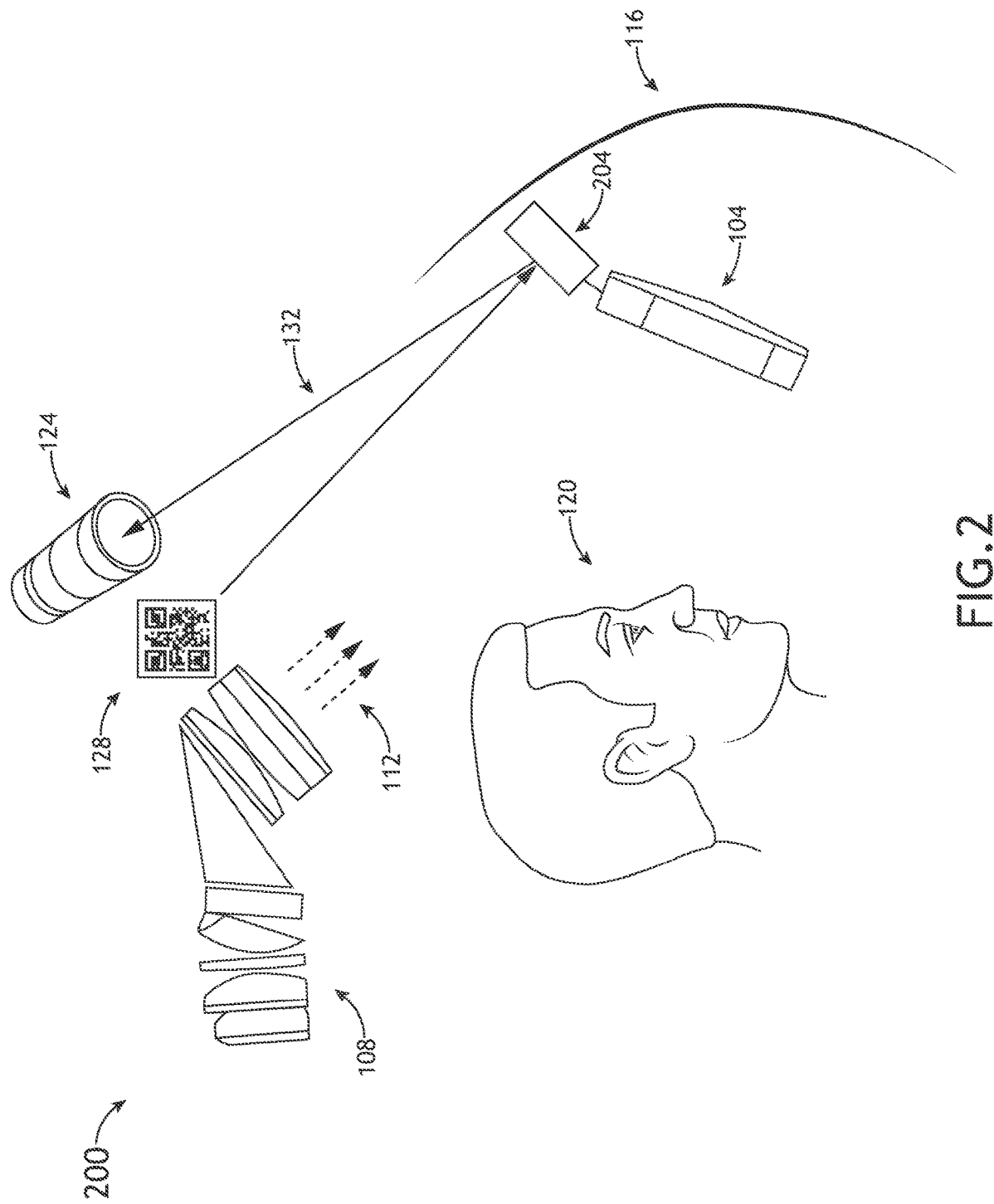
FIG. 2 illustrates a diagram of CAD system configured to detect the status of an optical alignment between a combiner and a relay lens assembly of a HUD using a mirror, in accordance with one or more embodiments of this disclosure.

FIG. 2 illustrates a CAD system 200 configured to detect the status of an optical alignment between the combiner 104 and the relay lens assembly 108 of a HUD, in accordance with one or more embodiments of this disclosure. The CAD system 200 includes one or more, or all the components of the CAD system 100, and vice-versa. In some embodiments, the CAD system 200 includes a mirror 204 coupled to combiner 104 and configured to reflect the reticle signal 132 from the reticle 128 to the sensor 124. (e.g., the mirror 204 is optically coupled to the sensor 124). For example, the reticle 128 may be directly or indirectly coupled to the relay lens assembly 108, the sensor 124 may be directly or indirectly coupled to the relay lens assembly 108, and the mirror reflects light emitted from the reticle 128 to the sensor 124, resulting in an electrical signal that is sent from the sensor 124 for processing. Therefore, in this configuration of the CAD system 200, the reticle 128 is spatially coupled to the relay lens assembly 108, the mirror is spatially coupled to the combiner 104, and the sensor 124 is spatially coupled to the relay lens assembly 108 as well as optically coupled to the mirror 204), allowing the CAD system 200 to accurately determine the position of the combiner 104 relative to the relay lens assembly 108 based on the input received from the sensor 124.

Figure 3:
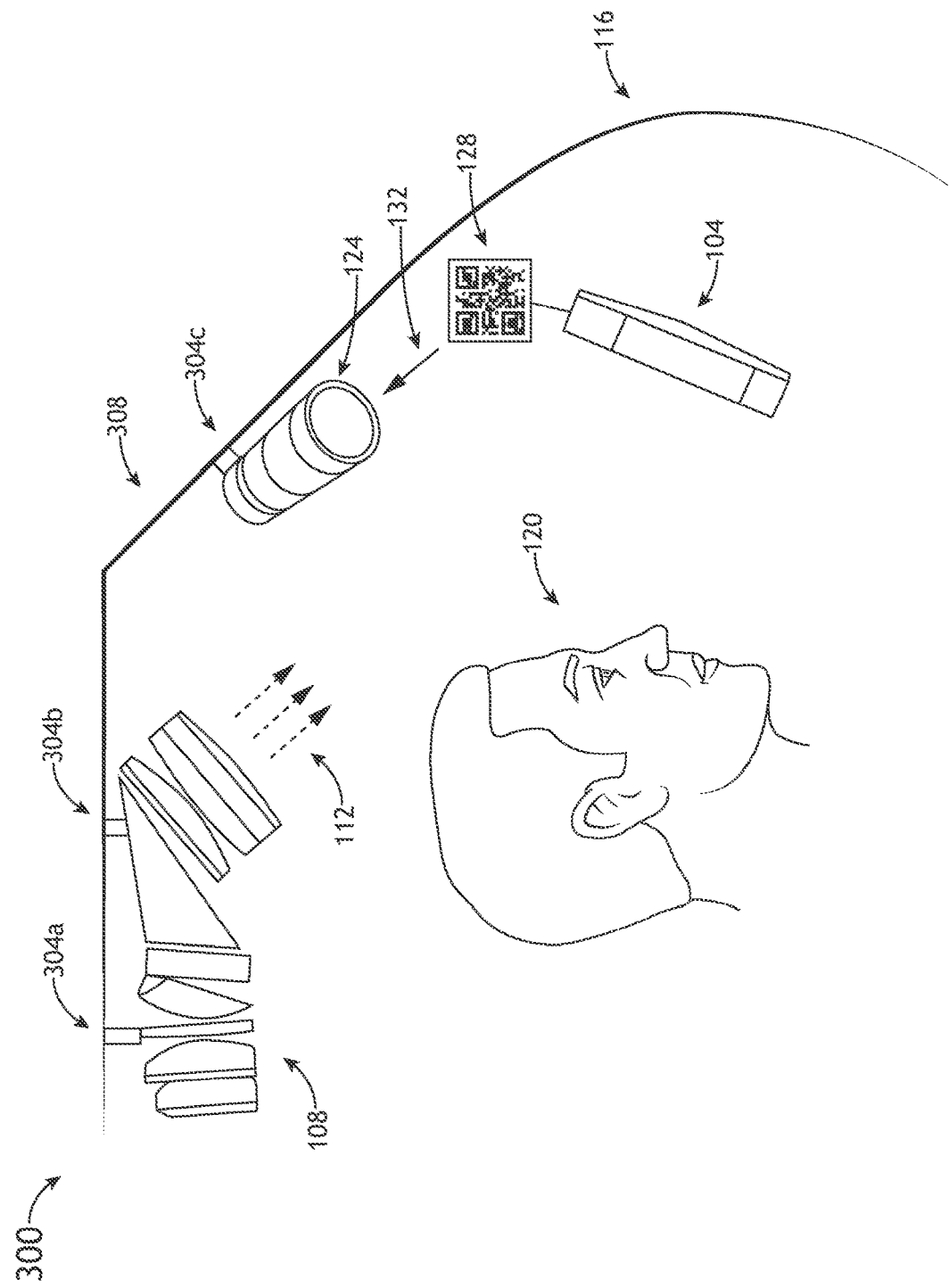
FIG. 3 illustrates a diagram of CAD system configured to detect the status of an optical alignment between a combiner and a relay lens assembly of a HUD, in accordance with one or more embodiments of this disclosure.

FIG. 3 illustrates a CAD system 300 configured to detect the status of an optical alignment between the combiner 104 and the relay lens assembly 108 of a HUD, in accordance with one or more embodiments of this disclosure. The CAD system 300 includes one or more, or all the components of the CAD system 100, 200, and vice-versa. In some embodiments, the CAD system 300 includes one or more bushings 304a-c attached to the aircraft frame 308 that are configured to firmly couple, directly or indirectly, the HUD, components of the HUD (e.g., bushings 304 a,b for the relay lens assembly 108), and the sensor 124 (e.g., bushings 304c) to the aircraft frame 308. The attachment of the bushings 304a-c directly or indirectly to the relay lens assembly 108 and the sensor 124 ensure that the relay lens assembly 108 and the sensor 124 are spatially coupled to each other, even if the relay lens assembly 108 and the sensor 124 are not immediately adjacent to each other. In the CAD system 300, the reticle 128 is coupled to the combiner 104, and is configured to emit the reticle signal 132 a relatively short distance to the sensor 124. Therefore, in this configuration of the CAD system 300, the sensor 124 is spatially coupled to the relay lens assembly 108, and the reticle 128 is spatially coupled to the combiner 104, allowing the CAD system 300 to accurately determine the position of the combiner 104 relative to the relay lens assembly 108 based on the input received from the sensor 124.

Figure 4:
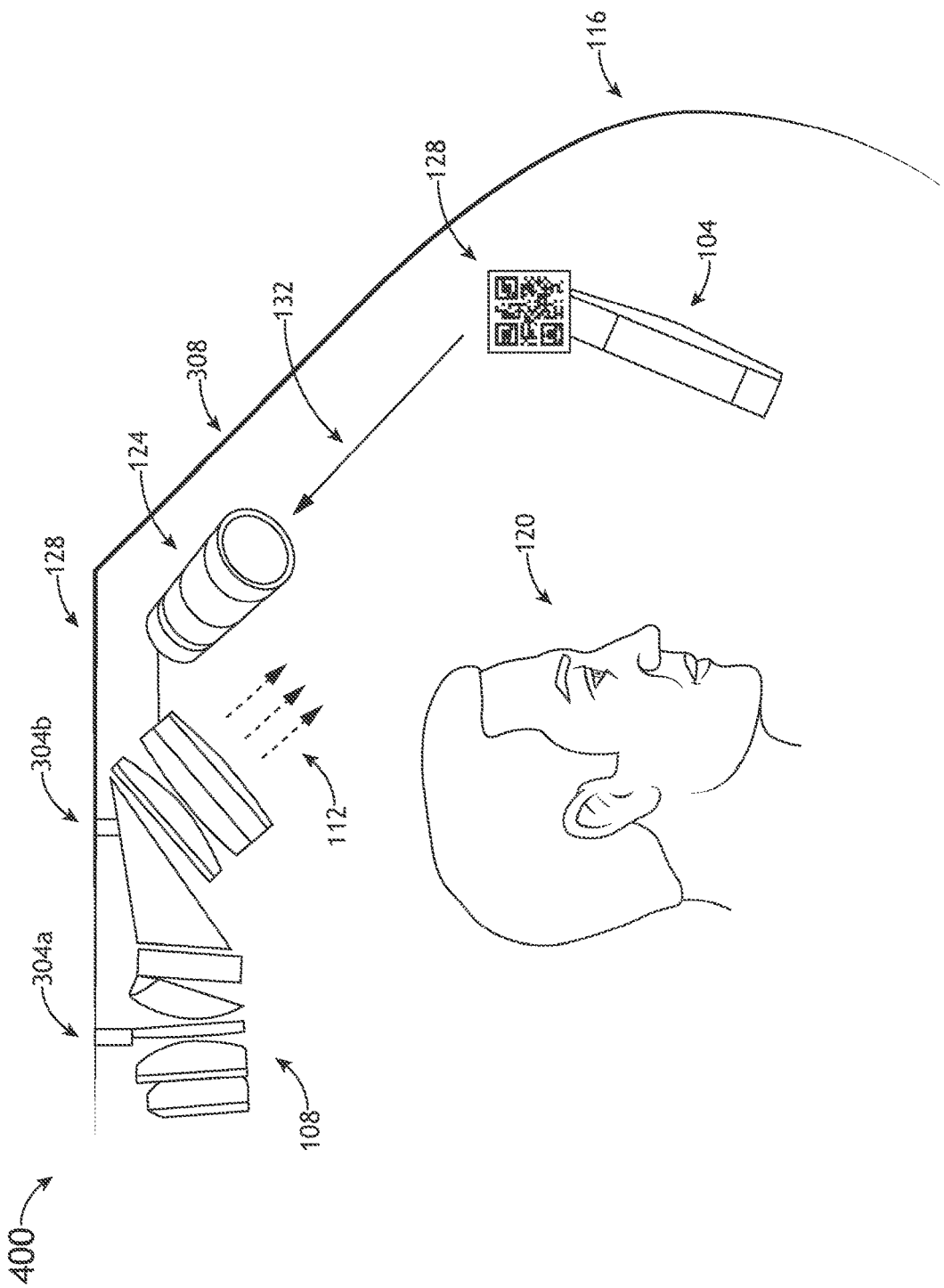
FIG. 4 illustrates a diagram of CAD system configured to detect the status of an optical alignment between a combiner and a relay lens assembly of a HUD, in accordance with one or more embodiments of this disclosure.

FIG. 4 illustrates a CAD system 400 configured to detect the status of an optical alignment between the combiner 104 and the relay lens assembly 108 of a HUD, in accordance with one or more embodiments of this disclosure. The CAD system 400 includes one or more, or all the components of the CAD system 100, 200, 300, and vice-versa. In some embodiments, the sensor 124 of the CAD system 300 is directly or indirectly attached, positioned adjacent to, and spatially coupled to, the relay lens assembly. For example, the relay lens assembly 108 may be attached directly or indirectly to the aircraft frame 308 (e.g., via bushings 304a,b) while the sensor 124 is coupled directly or indirectly to the relay lens assembly 108 (e.g., the sensor 124 relies on the same bushings 304 a,b for coupling to the aircraft frame 308, which also assist in spatially coupling the relay lens assembly 108 to the sensor 124. The reticle 128 of the CAD system 400 is spatially coupled to the combiner 104 (e.g., a movement of the combiner results in a commensurate movement of the illuminated reticle), and configured to emit a reticle signal 132 to the sensor 124. Therefore, in this configuration of the CAD system 400, the sensor is 124 spatially coupled to the relay assembly 108, and the reticle 128 is spatially coupled to the combiner 104, allowing the CAD system 400 to accurately determine the position of the combiner 104 relative to the relay lens assembly 108 based on the input received from the sensor 124.

Figure 5:
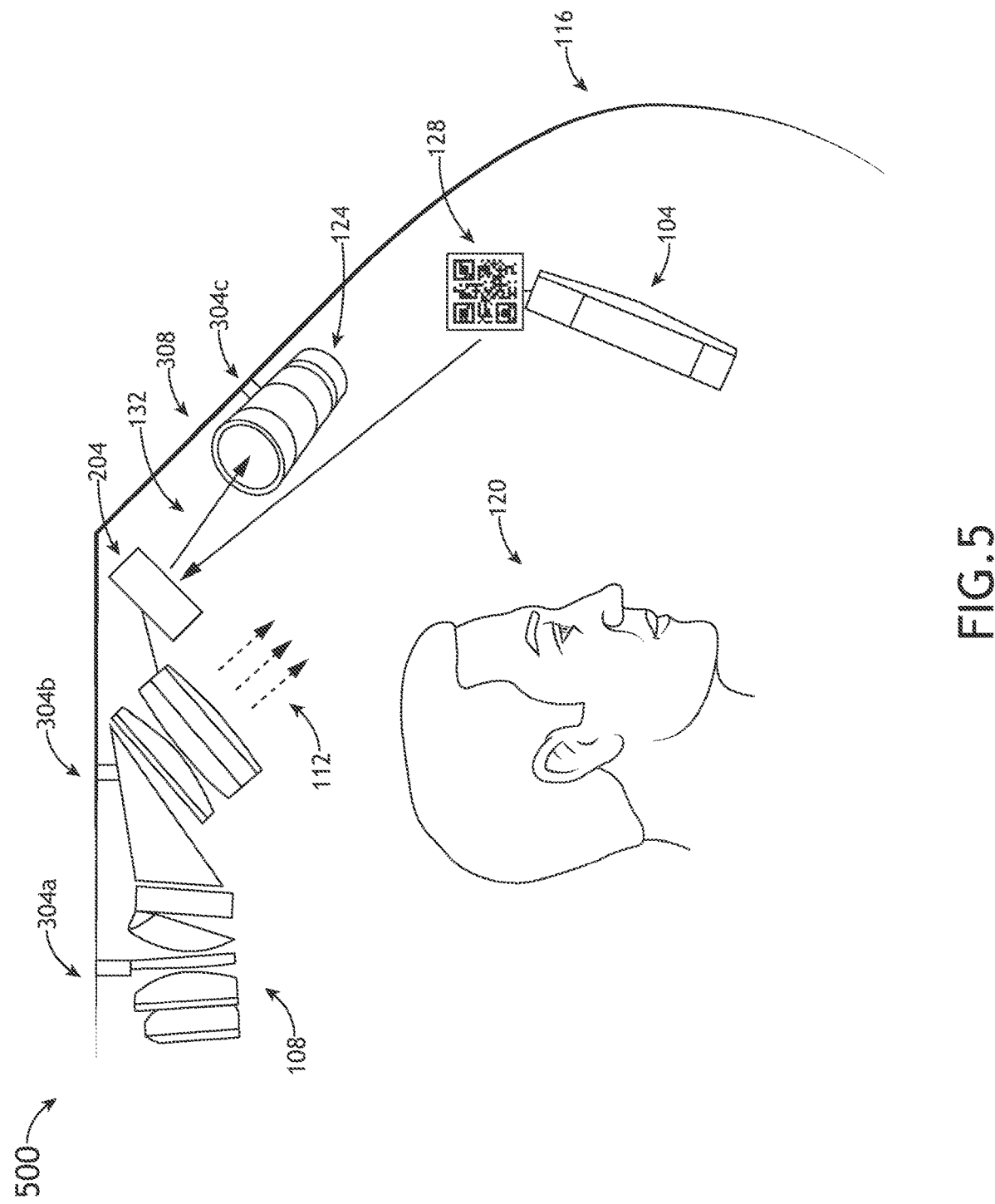
FIG. 5 illustrates a diagram of CAD system configured to detect the status of an optical alignment between a combiner and a relay lens assembly of a HUD using a mirror, in accordance with one or more embodiments of this disclosure.

FIG. 5 illustrates a CAD system 500 configured to detect the status of an optical alignment between the combiner 104 and the relay lens assembly of a HUD, in accordance with one or more embodiments of this disclosure. The CAD system 500 includes one or more, or all the components of the CAD system 100, 200, 300, 400, and vice-versa. In some embodiments, the CAD system 500 includes the mirror 204, which is directly or indirectly coupled to the relay lens assembly 108 or the aircraft frame 308, the sensor 124 and the relay lens assembly 108 is directly or indirectly coupled to the aircraft frame 308. The reticle 128 is spatially coupled to the combiner 104, and is configured to emit the reticle signal 132 toward the mirror 204, which is then reflected to the sensor. Therefore, in this configuration of the CAD system 500, the sensor 124 is spatially coupled to the relay assembly 108, and the reticle 128 is spatially coupled to the combiner 104, allowing the CAD system 500 to accurately determine the position of the combiner 104 relative to the relay lens assembly 108 based on the input received from the sensor 124.

It should be understood that the CAD systems 100, 200, 300, 400, 500 may include any number or arrangement of components that are associated with the emission of the reticle signal 132 by the reticle 128 and the reception of the reticle signal 132 by the sensor 124 provided that the position of the combiner 104 can be determined relative to the relay lens assembly 108. Therefore, the above description should not be interpreted as a limitation of the present disclosure, but merely an illustration.

Figure 6:
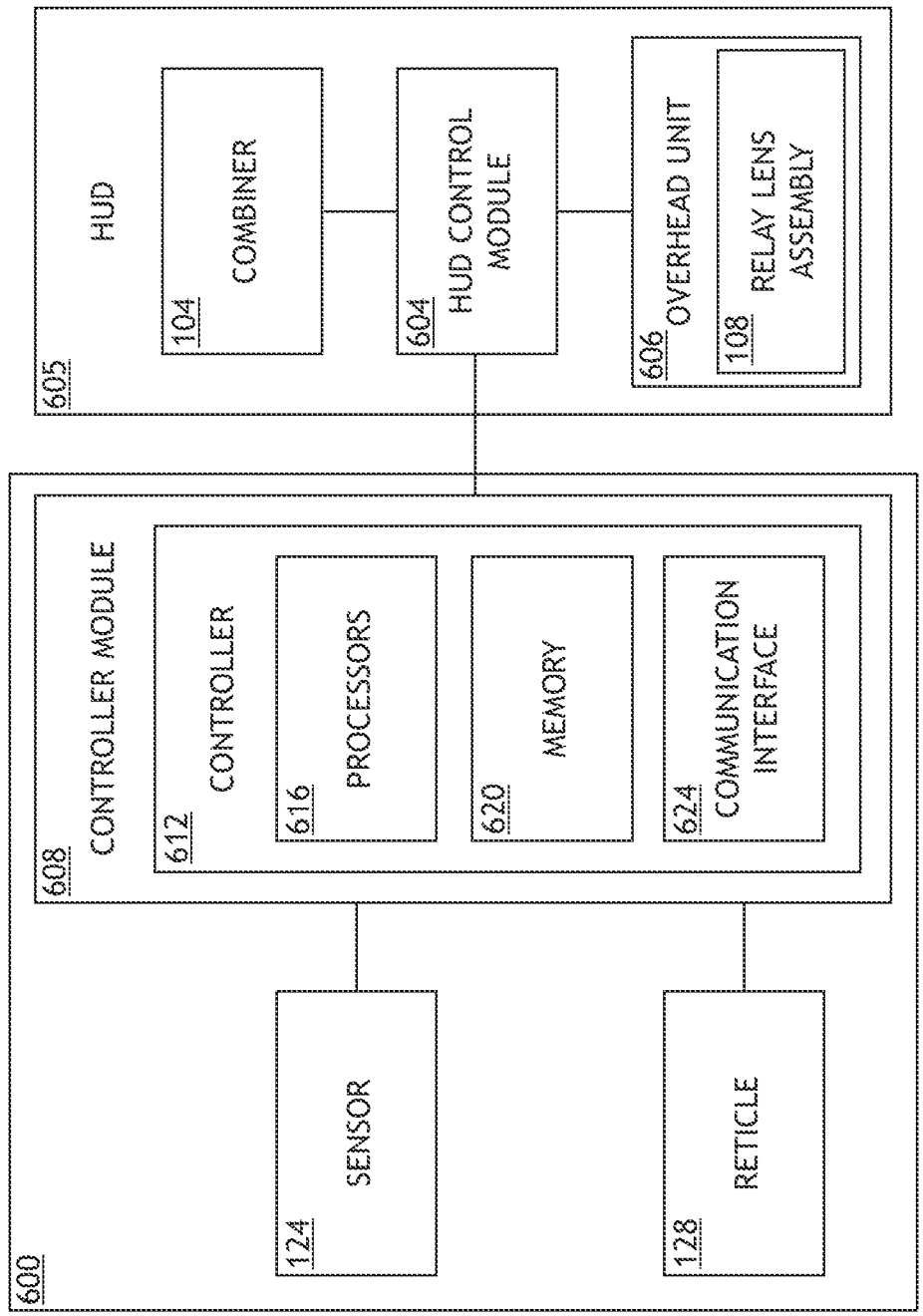
FIG. 6 is a block diagram of a CAD system communicatively coupled to an HUD control module, in accordance with one or more embodiments of the disclosure.

FIG. 6 is a block diagram of a CAD system 600 communicatively coupled to an HUD control module 604, in accordance with one or more embodiments of the disclosure. The HUD control module 604 is configured as one of the one or more processing units for the HUD 605, which also includes the combiner 104 and an overhead unit 606 containing the relay lens assembly 108. The CAD system 600 may be configured as a stand-alone system apart from the HUD 605 or may have one or more components combined with the HUD 605.

The CAD system 600 includes one or more, or all of the components of the CAD system 100, 200, 300, 400, 500 and vice-versa (e.g., CAD system 100, 200, 300, 400, 500 may have one or more, or all of the components of the CAD system 600). In embodiments, the CAD system 600 includes a control module 608 configured to receive input from the sensor 124, determine a position based on the combiner 104 relative to the relay lens assembly 108 based on the received input, and generate an output based on a determined position of the a, b combiner 104 relative to the relay lens assembly 108. Once generated, the output is transmitted to the HUD control module 604. The HUD control module 604 may then determine whether the signal emitted from the relay lens assembly 108 should be adjusted based on the output, whether the position of the combiner should be adjusted based on the output, or both.

In some embodiments, the control module 608 includes a controller 612 that includes one or more processors 616, a memory 620, and a communication interface 624. The controller 612 is configured to provide processing functionality for at least the control module 608 and can include the one or more processors 616 (e.g., micro-controllers, circuitry, field programmable gate array (FPGA), central processing units (CPU), application-specific integrated circuit (ASIC), or other processing systems), and resident or external memory 620 for storing data, executable code, and other information. The controller 612 can execute one or more software programs embodied in a non-transitory computer readable medium (e.g., memory 620) that implement techniques described herein. The controller 612 is not limited by the materials from which it is formed or the processing mechanisms employed therein and, as such, can be implemented via semiconductor(s) and/or transistors (e.g., using electronic integrated circuit (IC) components), and so forth.

The memory 620 can be an example of tangible, computer-readable storage medium that provides storage functionality to store various data and/or program code associated with operation of the controller 612, such as software programs and/or code segments, or other data to instruct the controller 612, and possibly other components of the control module 608, to perform the functionality described herein. Thus, the memory 620 can store data, such as a program of instructions for operating the control module 608, including its components (e.g., controller 612, communication interface 624, etc.), and so forth. The memory 620 may also store data derived from the sensor 124. It should be noted that while a single memory 620 is described, a wide variety of types and combinations of memory 620 (e.g., tangible, non-transitory memory) can be employed. The memory 620 may be integral with the controller 612, may comprise stand-alone memory, or may be a combination of both. Some examples of the memory 620 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 624 may be operatively configured to communicate with components of the control module 608 and the system 500. For example, the communication interface 624 can be configured to retrieve data from the controller 612 or other components, transmit data for storage in the memory 620, retrieve data from storage in the memory 620, and so forth. The communication interface 624 can also be communicatively coupled with the controller 612 to facilitate data transfer between components of the control module 608 and the controller 612. It should be noted that while the communication interface 624 is described as a component of the control module 608, one or more components of the communication interface 624 can be implemented as external components communicatively coupled to the control module 608 via a wired and/or wireless connection. The control module 608 can also include and/or connect to one or more input/output (I/O) devices. In embodiments, the communication interface 624 includes or is coupled to a transmitter, receiver, transceiver, physical connection interface, or any combination thereof.

In some embodiments, the CAD system 600 is configured to reduce the effects of jitter within the HUD 605. For example, a pilot flying an aircraft through turbulence without a CAD system may notice a "jitter" on the display, where the displayed images and symbology jitters or jumps around compared to the real-world view. The CAD system 600 may, through communication with the HUD control module or other componentry that controls the direction of emission of the flight information 112 through the relay lens assembly 108, the position of the relay lens assembly 108, or the position of the combiner 104), activate a feedback loop, enabling the HUD display to reposition or scale its image so that it compensated for the observed jitter. This feedback loop may require that the CAD system 600 is configured to receive information regarding the direction of emission of the flight information 112 through the relay lens assembly 108, the position of the relay lens assembly 108, or the position of the combiner 104 in real time.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
a head-up display comprising:
an overhead unit comprising a relay lens assembly; and
a combiner;
an illuminated reticle spatially coupled to the relay lens assembly, wherein a movement of the relay lens assembly results in a commensurate movement of the illuminated reticle, wherein the illuminated reticle comprises a light emitting diode and a diffuser, wherein the illuminated reticle is configured to emit a light pattern;
an optical sensor;
a mirror spatially coupled to the combiner and configured to reflect light from the illuminated reticle to the optical sensor, wherein the optical sensor is optically coupled to the mirror, wherein the optical sensor is configured to detect the light pattern emitted from the illuminated reticle; and
a control module comprising one or more processors and a memory, wherein the control module is configured to:
receive an input from the optical sensor;
determine a position of the combiner relative to the relay lens assembly based on the input;
generate an output based on a determined position of the combiner relative to the relay lens assembly;
recognize the light pattern and determine an X, Z position of the illuminated reticle relative to the position of the optical sensor; and
determine a distance from the optical sensor to the illuminated reticle based on a dispersion of the light pattern from the illuminated reticle.

2. The system of claim 1, wherein the illuminated reticle is configured to emit light at a wavelength equal or less than 500 nm.

3. The system of claim 1, wherein the illuminated reticle is configured to emit light at a wavelength ranging from 430 nm to 470 nm.

4. The system of claim 1, wherein the control module is configured to determine a distance between the control module and the relay lens assembly.

5. The system of claim 1, wherein the illuminated reticle is coupled directly to the relay lens assembly, wherein the optical sensor is coupled directly to the relay lens assembly.

6. The system of claim 1, wherein the optical sensor is configured as a camera.

7. The system of claim 1, wherein the system is configured to participate in a feedback loop with the head-up display, wherein the control module is further configured to receive position data of at least one of the relay lens assembly, the combiner, or an emission of a flight information signal, wherein the feedback loop is configured to reduce jitter in the head-up display.

* * * * *